US005349194A

United States Patent [19]

Wuest et al.

[11] Patent Number: 5,349,194

[45] Date of Patent: Sep. 20, 1994

[54] MICROGAP ULTRA-VIOLET DETECTOR

[75] Inventors: Craig R. Wuest, Danville; Richard M. Bionta, Livermore, both of Calif.

[73] Assignee: The United States of America as represented by the United States Department of Energy, Washington, D.C.

[21] Appl. No.: 11,636

[22] Filed: Feb. 1, 1993

[51] Int. Cl.$^5$ .......................... G01J 5/28; H01J 40/06

[52] U.S. Cl. ...................................... 250/372; 250/374

[58] Field of Search ................................ 250/374, 372

[56] References Cited

U.S. PATENT DOCUMENTS

| | | | |
|---|---|---|---|
| 3,342,995 | 9/1967 | Axmark | 250/372 |
| 3,656,019 | 4/1972 | Stowe | 313/217 |
| 3,952,197 | 4/1976 | Samson | 250/382 |
| 3,965,354 | 6/1976 | Fletcher et al. | 250/336.1 |
| 4,376,892 | 3/1983 | Charpak et al. | 250/372 |
| 4,614,871 | 9/1986 | Driscoll | 250/372 |
| 4,871,915 | 10/1989 | Prince | 250/372 |
| 4,889,994 | 12/1989 | Brown et al. | 250/374 |
| 5,001,348 | 3/1991 | Dirscherl et al. | 250/372 |
| 5,032,729 | 7/1991 | Charpak | 250/385.1 |

FOREIGN PATENT DOCUMENTS

91/15028 10/1991 World Int. Prop. O. .......... 250/374

OTHER PUBLICATIONS

A. Peisert and F. Sauli, "A Two-Dimensional Parallel-Plate Chamber for High-Rate Soft X-Ray Detector", *Nuclear Instruments and Methods In Physics Research* A, vol. 127 (Jul. 1, 1986) pp. 453–459.

*Primary Examiner*—Constantine Hannaher
*Attorney, Agent, or Firm*—L. E. Carnahan; Roger S. Gaither; William R. Moser

[57] ABSTRACT

A microgap ultra-violet detector of photons with wavelengths less than 400 run (4000 Angstroms) which comprises an anode and a cathode separated by a gas-filled gap and having an electric field placed across the gap. Either the anode or the cathode is semi-transparent to UV light. Upon a UV photon striking the cathode an electron is expelled and accelerated across the gap by the electric field causing interactions with other electrons to create an electron avalanche which contacts the anode. The electron avalanche is detected and converted to an output pulse.

23 Claims, 1 Drawing Sheet

MICROGAP ULTRA-VIOLET DETECTOR

The United States Government has rights in this invention pursuant to Contract No. W-7405-ENG-48 between the U.S. Department of Energy and the University of California for the operation of Lawrence Livermore National Laboratory.

BACKGROUND OF THE INVENTION

The invention relates to photon detectors, particularly to an ultraviolet detector which involves the conversion of ultra-violet photons into electrons and subsequent amplification of these electrons via generation of electron avalanches.

Photon detectors operate by converting photons into electronic signals that can be processed into pulses or images. These include devices such as photodiodes, photomultiplier tubes, vidicons, charged-coupled devices (CCD's) etc. All photon detectors are characterized by their sensitivity to photons as a function of photon energy, their ability to amplify incident photons into large electrical signals proportional to the incident photon intensity (gain), their ability to distinguish fine detail in an image (position resolution), their temporal response to incident photons (time resolution), and their inherent noise level (dark current).

Various types of photon detectors and detection systems have been developed for various applications. These prior detectors and detection/imaging systems are exemplified by the following U.S. Pat. No. 5,032,729 issued Jul. 16, 1991 to G. Charpak; U.S. Pat. No. 5,001,348 issued Mar. 19, 1991 to R. Dirscherl et al.; U.S. Pat. No. 4,889,994 issued Dec. 26, 1989 to A. R. Brown et al.; U.S. Pat. No. 4,871,915 issued Oct. 3, 1989 to K. C. Prince; U.S. Pat. No. 4,614,871 issued Sep. 30, 1986 to J. N. Driscoll; U.S. Pat. No. 3,965,354 issued Jun. 22, 1976 to J. C. Fletcher et al.; U.S. Pat. No. 3,952,197 issued Apr. 20, 1976 to J. A. R. Samson; U.S. Pat. No. 3,656,019 issued Apr. 11, 1972 to R. W. Storve and U.S. Pat. No. 3,342,995 issued Sep. 19, 1967 to R. E. Axmark.

Imaging in high radiation environments, such as in nuclear reactors, normal ultra-violet (UV) sensitive CCD cameras and vidicon TV cameras are plagued by noise pickup. Also, the prior known systems are not greatly effective when used in extremely low light level sensitivity television cameras. While photomultiplier tubes are widely utilized in the field of ultra-violet radiation detection they are expensive and susceptible to magnetic field.

The Superconducting Super Collider, when developed will require scintillation counters, and sets forth a need to instrument roughly 6000 square meters of liquid or solid scintillator with photodetectors that are rugged, radiation-hardened, and able to operate in a high magnetic field. This need is not easily fulfilled from a operation and cost effective standpoint by the prior known photomultiplier tubes due to their cost and susceptibility to magnetic fields. Thus, there is a need for a simple yet effective ultra-violet sensitive detector.

The above need is satisfied by the microgap ultra-violet detector of this invention which is of simple construction, exhibits photon sensitivity over a wide range of energies, exhibits fast time response, provides adjustable gain, and exhibits low noise. Unlike CCD detectors, the present invention is not subject to radiation damage.

SUMMARY OF THE INVENTION

It is an object of the present invention to provide an improved ultra-violet detector.

A further object of the invention is to provide a detector of photons with wavelengths less than 400 nm.

A further object of the invention is to provide a detector for ultraviolet photons wherein the photons are converted to electrons with subsequent amplification through generation of electron avalanches which are detected and converted to output signals.

A further object of the invention is to provide an ultra-violet detector which exhibits photon sensitivity over a wide range of energies, fast time response, adjustable gain, and low noise.

Another object of the invention is to provide a detector for ultraviolet photons which is simple in construction in that it consists of a coplanar anode and cathode separated by a thin gas-filled gap having an electrical potential applied there across and provided with charge sensing means for detecting electron avalanches on the anode.

Another object of the invention is to provide a microgap ultraviolet photon detector wherein either the anode or the cathode is semitransparent to ultra-violet light.

Other objects and advantages of the present invention will become apparent from the following description and accompanying drawings.

The invention is directed to a microgap ultra-violet (UV) detector for detecting photons with wavelengths less than 400 nm (4000 Angstroms). The microgap detector comprises an anode and a cathode separated by a gap. Either the anode or the cathode is semi-transparent to UV light. The cathode operates as a photocathode that expels electrons when UV photons are incident thereon. The gap between the anode is filled with a gas and an electric potential is applied between the anode and cathode to produce an electric field within the gap. When electrons are expelled from the cathode they are accelerated across the gap by the electric field and interact with other electrons in the gas resulting in the generation of an electron avalanche which is directed onto the anode and detected by a charge sensitive preamplifier which converts to electron charge into an output pulse, which is directed through conventional electronic circuitry to a point of use, such as an oscilloscope or a camera.

The microgap ultra-violet detector of the present invention may be utilized in a wide variety of applications such as detecting emissions from combustion products, in scintillation counters, imaging detectors for fiber optic bundles, with variable light levels, in high radiation environments such as nuclear reactors having a high noise level, for extremely low light sensitivity cameras, and nearly all applications where UV-sensitive CCD cameras are currently used.

BRIEF DESCRIPTION OF THE DRAWINGS

The accompanying drawings, which are incorporated into and form a part of the disclosure, illustrate embodiments of the invention and, together with the description, serve to explain the principles of the invention.

DETAILED DESCRIPTION OF THE INVENTION

The microgap ultra-violet (UV) detector of the present invention achieves the conversion of ultra-violet photons into electrons (photoelectrons) and subsequent amplification of these photoelectrons through the generation of electron avalanches in a thin gas-filled region or gap, between the anode and the cathode, which is subjected to a high electric potential. The detector of this invention has a number of desirable features that makes it a potentially excellent replacement for present-day photodetectors. The microgap UV detector exhibits photon sensitivity over a wide range of energies, with an upper limit of about 8 eV (150 nm wavelength) and a lower limit of about 3.1 eV (400 nm wavelength). The detector exhibits the fast time response typical of photomultiplier tubes, with pulse widths less than 10 nanoseconds (ns) and as fast as 1 ns, thus allowing it to operate with frequency response up to the gigahertz (GHz) level. The detector provides adjustable gain of up to about $10^9$ depending on the choice of fill gas and electric potential. Also, the detector exhibits low noise, typical of photomultiplier tubes.

Suitable choices of the photocathode and anode geometry allow this detector to perform as a position sensitive detector, with position resolution similar to a CCD or Vidicon, but with a factor of 1000 times the speed of readout. The speed of the detector allows for unprecedented dynamic range of visual information, allowing for the detection of photons with high fidelity in conditions that would normally saturate CCD detector pixels. This dynamic range enhancement is achieved through a combination of the inherent time response of the detector and the application of fast electronics as read out individual anode elements in a parallel manner. While not illustrated herein, the UV detector may be electronically connected as a microgap camera similar to the microgap x-ray camera arrangement illustrated in applicants' copending U.S. patent application Ser. No. 08/011,637, filed Feb. 1, 1993, entitled "Microgap X-ray Detector", and assigned to the same assignee.

Figure 1:
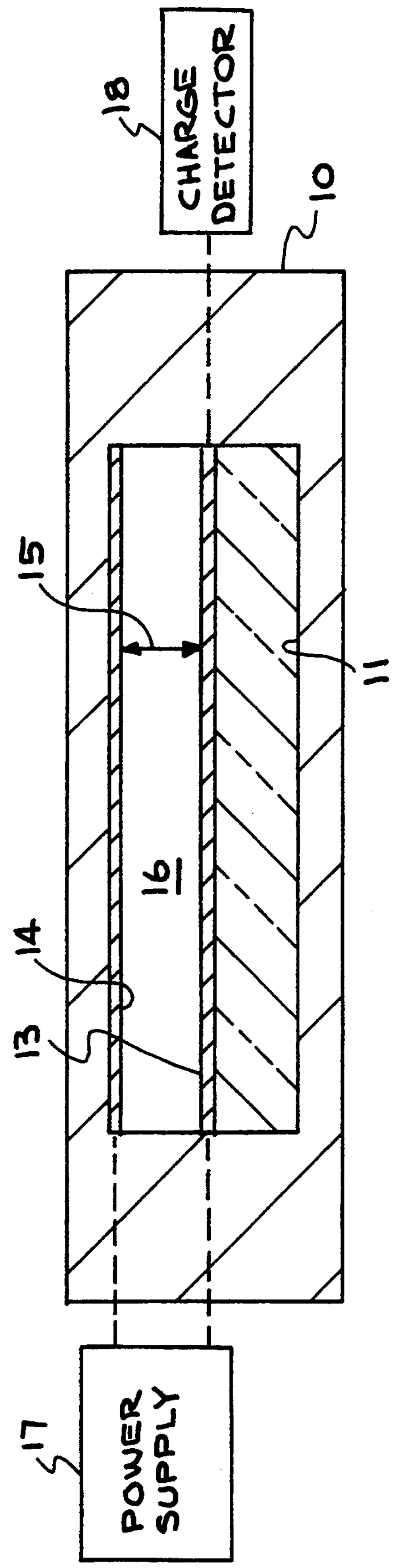
FIG. 1 is a schematic view of an embodiment of the microgap ultra-violet detector with a semi-transparent anode and an opaque photocathode.
Figure 2:
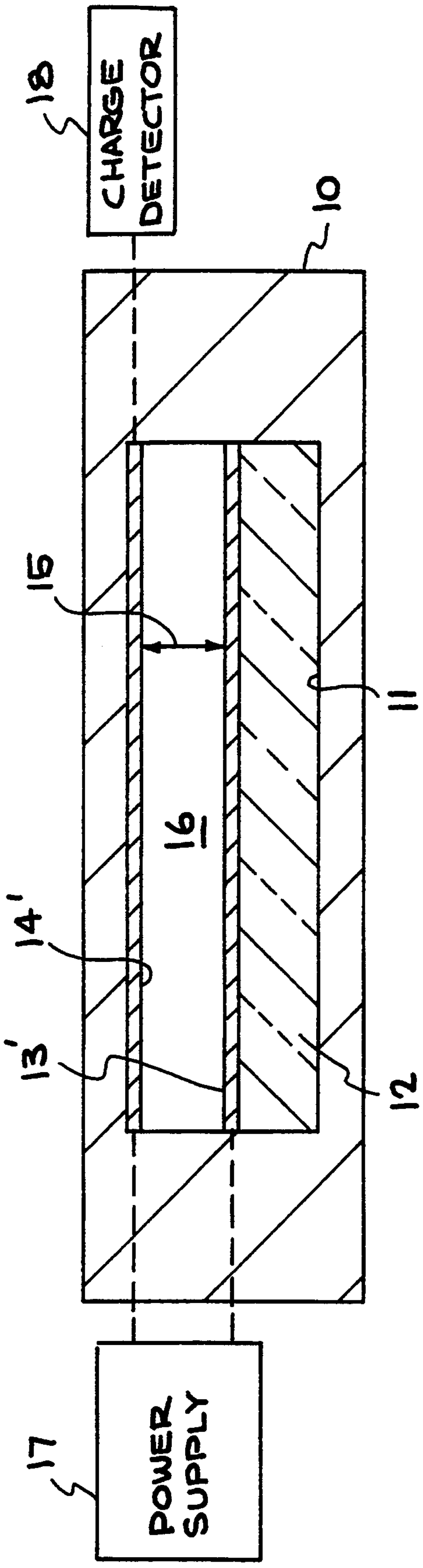
FIG. 2 is a schematic view of another embodiment of the microgap ultra-violet detector with a semi-transparent photocathode and an opaque anode.

The microgap ultra-violet detector of the present invention is schematically illustrated by the embodiments of FIGS. 1 and 2. In it simplest form the detector consists of a coplanar anode and cathode separated by a thin gas-filled gap with a width or dimension, D. An electrical potential, V, is applied between the anode and the cathode to provide an electric field, E, that is equal to the electric potential divided by the gap dimension, $E=V/D$. The gap dimension and electric potential are chosen in order to provide an electric field of the order of $10^6$ volts per meter. Thus, a gap of 100 microns ($10^{-4}$ m) and an electric potential of 500 volts gives an electric field, $E=500$ volts/$10^{-4}$m$=5\times10^6$ volts/meter.

The embodiment of FIG. 1 comprises a housing 10 constructed of aluminum having an opening 11 extending there through within which are located a window 12 constructed of quartz, an anode 13 constructed of 200 Å semi-transparent gold, a cathode (photocathode) 14 constructed of yttrium, with a gap or region 15 having a width of 100 microns between anode 13 and cathode 14 and containing a gas 16 composed of 90% argon/10% methane, known as P10 and at a pressure of 1 atm. A power supply 17 is operatively connected as indicated by dashed lines to the anode 13 and cathode 14 for directing an electric potential of 500 volts there between for producing an electric field through gas 16. A charge detector 18, such as a charge sensing preamplifier, is electronically connected as indicated by dashed line to detect charges produced by electron avalanches on the anode 13 and convert such charge pulses into a current or voltage pulses that can be read using standard electronic circuitry.

The housing 12, while described above as being constructed of aluminum, may also be made of plastic, ceramic or stainless steel, with the opening 11 therein having a length of 20 cm and width of 20 cm and height of 5 cm, for example. The window 12, described above as being constructed of quartz and has a thickness of 2 ram, may also be made of fused silica, UV transparent plastic, and sapphire, or other material transparent to ultra-violet photons, and having a thickness of 1 mm to 5 mm, depending on the type of material it is made of.

Cathode 14 consists of a material with a property such that it expels electrons when photons are incident upon it. Cathodes of this type are called photocathodes and the expelled electrons are called photoelectrons. The photocathode 14 of this detector is sensitive to ultra-violet light and in the FIG. 1 embodiment consists of yttrium, which was chosen because of its UV-sensitivity as well as its stability (lack of oxidation and degradation in the presence of the gas 16). However, the photocathode 14 may also be constructed of cesium iodide, silver, gold and chromium. By way of example, the photocathode 14 constructed of yttrium in the FIG. 1 embodiment has a cross-section of 6 cm$\times$6 cm and thickness of 100 $\mu$m. The thickness of the photocathode will be dependent upon the material thereof and the width will be dependent upon the configuration of the anode 13, be it a continuing plane or a plurality of spaced sections, which may result in differing widths.

When a photoelectron is ejected out of the photocathode 14 and into the thin gas-filled gap 15 it is accelerated in the extremely high electric field within gap 15 towards the anode 13. The accelerating electron collides with other electrons in the atones of gas 16 to create additional electrons, and so on, until an electron avalanche is formed. An electron avalanche can best be thought of as a sort of electron chain reaction. Under the proper choices of gas type, and pressure, and electric field, gains of $10^9$ or more can be achieved by the time the electron avalanche reaches the anode 13. The avalanche is detected on the anode 13 with a detector 18, such as a charge sensing preamplifier, known in the art, which converts the charge pulse into a current or voltage pulse or signal that can be read via standard electronic circuitry.

While the gap 15 in the FIG. 1 embodiment has been indicated above as having a width or dimension, D, of 100 microns, the gap width may vary from 5 $\mu$m to 1 mm, depending on the type of gas 16 and the electric potential applied there through. While the gas 16 has been described above as being composed of 90% argon/10% methane, it can be argon/isobutane mixtures, or $CO_2/CF_4$, and the pressure may vary from 0.1 atm to 2 atm depending on the type of gas and the desired electric field there through. Also, the electric potential provided by power supply 17, depends on the desired electrical field, gas type, and pressure, and may vary from the 500 volts as set forth in the above description of the FIG. 1 embodiment.

The anode 13 is configured as a conducting plane, consisting of a thin 200 Å (20 nm) coating of gold on window 12. This gold coating is semitransparent to UV photons, allowing them to pass there through to the photocathode 14 and providing an electrode surface on which electron avalanches can be collected. In this case, the microgap ultra-violet detector is analogous to a photomultiplier tube or photodiode. Anode 13 may also be constructed from other materials such as silver, chromium, copper and platinum, which are semi-transparent to UV photons but will function as an electrode for collecting the electron avalanches, and the thickness of the anode will depend on the material from which it is constructed. While anode 13 is described above as being configured as a conducting plane, it can be configured in spaced sections or as a square, for example, so as to function as a position sensitive detector, with position resolution similar to a CCD or Vidicon.

The microgap ultra-violet detector of this invention may also utilize a semi-transparent photocathode, in which case the anode is opaque. A detector embodiment of this type is illustrated in FIG. 2, and reference numerals corresponding to the components of the FIG. 1 embodiment are used. In this embodiment the semi-transparent photocathode 14 is coated on window 12. The operation of the detector embodiment of FIG. 2 is basically unchanged compared to the FIG. 1 embodiment, except that certain of the UV photons pass through semi-transparent photocathode 14′ without causing a photoelectron to be emitted there from and amplified as above described in gap 15 such that it generates an electron avalanche which is collected by the opaque anode 13′. Thus, not all of the photons cause electrons to be expelled from the photocathode 14′. Anode 13′ is constructed of opaque metallic material such as gold, silver, copper, and platinum, having a thickness of 500 Å to 1000 Å. In the FIG. 2 embodiment, opaque anode 13′ is constructed of gold having a thickness of 1000 Å; while semi-transparent photocathode 14′ is constructed of yttrium having a thickness of 200 Å. Semitransparent photocathode 14′ may also be constructed of cesium iodide, gold, and chromium having a thickness dependent upon the material of which it is constructed.

While the FIG. 2 embodiment illustrates a single anode 13′, when multiple anodes consisting of separate areas of conductive material are used and laid out in an area, and read out independently of each other, the individual avalanches can be read on individual anodes using multiple charge detectors so as to give position information corresponding to the anode position.

As set forth above, the microgap ultra-violet detector of this invention has many applications, such as to detect UV emissions from combustion products, for example, from rocket plumes. Additional applications of the detector would be for scintillation counters planned to be used in the Superconducting Super Collider (SSC), as well as imaging detectors for fiber optics bundles in the SSC and in underground nuclear tests. The detector can be used in nearly all applications where UV-sensitive CCD cameras are used including medical imaging. Since the detector exhibits a high dynamic range it can resolve images with highly variable light levels, such as an astronomy and astrophysics. Imaging in high radiation environments which involves inherent noise can be accomplished by the detector of this invention, as well as for use with extremely low light level sensitivity television cameras. Because of the simplicity of the detector of this invention, it is not subject to x-ray or ionizing radiation damage and has very low sensitivity to spurious noise induced by background charged and neutral particle radiation.

While particular embodiments of the invention have been illustrated and described and specific materials, parameters, etc. have been set forth to more fully illustrate the principles of this invention, such are not intended to limit the invention to that described and/or illustrated. Modifications and changes will become apparent to those skilled in this art. All modification, changes, etc. are within the scope of this invention when such fall within the scope of the appended claims.

We claim:

1. A detector for ultra-violet photons comprising:
   - a cathode composed of material that expels electrons when impinged on by ultra-violet photons;
   - an anode composed of material that collects electrons;
   - one of said cathode and anode being constructed of a layer of material which is semitransparent to ultra-violet photons;
   - said layer of material semitransparent to ultra-violet photons extending over an entire surface of said one of said cathode and anode constructed thereof;
   - a window composed of material transparent to ultra-violet photons;
   - one of said cathode and anode being located adjacent to said window;
   - aid cathode and said anode being located in spaced relation to form a gap therebetween;
   - said gap being filled with a gas;
   - means for applying an electric potential between said anode and said cathode for producing an electrical field in said gap; and
   - means for detecting electron avalanches on said anode.

2. The detector of claim 1, wherein said anode is constructed of material sen-ti-transparent to ultra-violet photons.

3. The detector of claim 2, wherein said anode material is selected from the group consisting of gold, copper, silver and platinum.

4. The detector of claim 3, wherein said anode material is gold having a thickness of about 200 Å.

5. The detector of claim 2, wherein said cathode is constructed of material selected from the group of yttrium, cesium iodide, gold, silver and chromium.

6. The detector of claim 5, wherein said cathode is constructed of yttrium having a thickness of about 1000 Å.

7. The detector of claim 1, wherein said gap has a width of 5 $\mu$m to 1 mm.

8. The detector of claim 7, wherein said gap has a width of about 100 microns.

9. The detector of claim 1, wherein said gas has a pressure in the range of 0.1 atm to 2 atm, and is selected from the group consisting of 90% argon/10% methane, argon/isobutane mixtures, and $CO_2/CF_4$.

10. The detector of claim 9, wherein said gas is composed of 90% argon/10% methane at a pressure of 1 atm.

11. The detector of claim 1, wherein said electric field, E, is determined by the electric potential, V, applied between said anode and said cathode divided by the dimension, D, of said gap, namely, $E=V/D$.

12. The detector of claim 11, wherein said electric potential, V, is 500 volts and said dimension, D, is 100 microns, whereby said electric field is $5\times10^6$ volts/meter.

13. The detector of claim 1, wherein said cathode is constructed of material semi-transparent to ultra-violet photons.

14. The detector of claim 13, wherein said anode is constructed of opaque metallic material selected from the group consisting of gold, silver, copper, chromium and platinum.

15. The detector of claim 13, wherein said cathode is constructed of material selected from the group consisting of yttrium, cesium iodide, gold, silver and chromium.

16. The detector of claim 15, wherein said cathode is constructed of semi-transparent yttrium having a thickness of 200 Å.

17. The detector of claim 16, wherein said anode is constructed of gold.

18. The detector of claim 17, wherein said gold anode has a thickness of 1000 Å.

19. A micro-gap ultra-violet detector comprising:

a photocathode;

an anode;

one of said photocathode and said anode being constructed of material which is semi-transparent to ultra-violet photons;

said photocathode and said anode being located in coplanar spaced relationship along all surfaces thereof an forming a gap therebetween;

said gap being filled with gas;

means for applying an electrical potential between said anode and said photocathode for producing an electric field in said gap; and means for detecting and removing a charge on said anode created by a photon striking said photocathode.

20. The detector of claim 19, wherein said anode is constructed of semi-transparent material.

21. The detector of claim 19, wherein said photocathode is constructed of semi-transparent material.

22. A micro-gap detector for detecting photons with wavelengths less than 400 nm, comprising:

a housing having an opening therein;

a photocathode and an anode being located in coplanar spaced relationship at all points thereon, and located in said opening of said housing and forming a gap therebetween;

one of said coplanar photocathode and anode being composed of material which is semi-transparent to ultra-violet photons;

said gap being filled with a gas;

means for producing an electric filed in said gap; and means for detecting and removing electrons collected on said anode.

23. A micro-gap detector for detecting photons with wavelengths less than 400 nm, comprising:

a housing having an opening therein;

a photocathode and an anode being located in coplanar spaced relationship, and located in said opening of said housing and forming a gap therebetween;

one of said coplanar photocathode and anode being composed of material which is semi-transparent to ultra-violet photons;

said gap being filled with a gas;

means for producing an electric field in said gap; and means for detecting and removing electron collected on said anode;

each of said photocathode and said anode being configured to have a width and length, said photocathode having a width dependent upon the configuration of the anode, and said anode being configured in differing widths when selected from the group consisting of a continuous plane, and a plurality of sections.

* * * * *